United States Patent
Kim et al.

(10) Patent No.: US 10,237,398 B2
(45) Date of Patent: Mar. 19, 2019

(54) APPARATUS FOR REVERSE POWER FEEDING IN ACCORDANCE WITH COMMUNICATION LINE ENVIRONMENTS AND A METHOD THEREOF

(71) Applicant: UBIQUOSS INC., Seongnam-si (KR)

(72) Inventors: Cheol Hwan Kim, Seongnam-si (KR); Jae Kug Kim, Seongnam-si (KR)

(73) Assignee: UBIQUOSS INC. (KR)

( * ) Notice: Subject to any disclaimer, the term of this patent is extended or adjusted under 35 U.S.C. 154(b) by 0 days.

(21) Appl. No.: 15/802,440

(22) Filed: Nov. 2, 2017

(65) Prior Publication Data
US 2018/0124235 A1    May 3, 2018

(30) Foreign Application Priority Data
Nov. 3, 2016    (KR) .................. 10-2016-0145848

(51) Int. Cl.
| | | |
|---|---|---|
| *H04M 3/22* | (2006.01) |
| *H04B 3/44* | (2006.01) |
| *H04L 1/00* | (2006.01) |
| *H04L 12/10* | (2006.01) |
| *H04L 12/28* | (2006.01) |
| *H04M 3/42* | (2006.01) |
| *H04M 19/00* | (2006.01) |
| *H04M 19/08* | (2006.01) |
| *H04B 10/80* | (2013.01) |

(52) U.S. Cl.
CPC ............ *H04M 3/2209* (2013.01); *H04B 3/44* (2013.01); *H04L 1/0006* (2013.01); *H04L 12/10* (2013.01); *H04L 12/2898* (2013.01); *H04M 3/42144* (2013.01); *H04M 19/001* (2013.01); *H04M 19/08* (2013.01); *H04B 10/808* (2013.01)

(58) Field of Classification Search
CPC ..... H04B 3/44; H04B 10/808; H04M 3/2209; H04M 3/42144; H04M 19/001; H04M 19/08; H04L 1/0006; H04L 12/10; H04L 12/2898

See application file for complete search history.

(56) References Cited

U.S. PATENT DOCUMENTS

| | | | |
|---|---|---|---|
| 7,672,448 B2 | 3/2010 | Schley-May et al. | |
| 8,897,431 B2 | 11/2014 | Hansen et al. | |
| 9,319,537 B2 | 4/2016 | Peker et al. | |
| 9,571,669 B2 * | 2/2017 | Peker | H04L 12/10 |
| 2018/0006683 A1 * | 1/2018 | Peker | H04B 3/44 |

* cited by examiner

*Primary Examiner* — Raymond S Dean

(74) *Attorney, Agent, or Firm* — Renaissance IP Law Group LLP

(57) ABSTRACT

The present invention relates to an apparatus for reverse power feeding in accordance with communication line environments and a method thereof, which measure line resistance (e.g., a difference in impedance depending on a distance between a customer premise (CP) and a distribution point (DP)) of a communication line (e.g., a twisted pair copper wire) connected to a distribution point at a customer premise and reflect the measured line resistance to perform stable power feeding to the distribution point.

10 Claims, 3 Drawing Sheets

200~ # APPARATUS FOR REVERSE POWER FEEDING IN ACCORDANCE WITH COMMUNICATION LINE ENVIRONMENTS AND A METHOD THEREOF

CROSS-REFERENCE TO RELATED APPLICATION

This application claims priority to and the benefit of Korean Patent Application No. 10-2016-0145848 filed in the Korean Intellectual Property Office on Nov. 3, 2016, the entire contents of which are incorporated herein by reference.

TECHNICAL FIELD

The present invention relates to an apparatus for reverse power feeding in accordance with communication line environments and a method thereof, which measure line resistance (e.g., a difference in impedance depending on a distance between a customer premise (CP) and a distribution point (DP)) of a communication line (e.g., a twisted pair copper wire) connected to a distribution point at a customer premise and reflect the measured line resistance to perform stable power feeding to the distribution point.

BACKGROUND

In general, since a distribution apparatus provided at a distribution point in an access network is located at a place where it is difficult to connect independent power sources such as ground or manhole, the distribution apparatus operates by reversely receiving power supplied from a power supply apparatus located at an end subscriber on a network. A concept of power supply of such a scheme is called reverse power feeding (RPF).

In a network structure using the reverse power supply, the distribution point is connected with at least one customer premise (normally, four ports are generally used) and operates by receiving power from at least one customer premise.

In a standard, there is no problem with load balancing because the reverse power supply is designed based on one port, but in an actual design, since the reverse power supply is designed based on multiple (for example, four) ports, equal distribution of an electric charges for each user and an electric charge equal to the used electric charge are required.

Since all of one or more customer premises connected to the distribution point are continuously used at the same time, controlling the load balancing of the reverse power feeding is required. The reason is that when the load balancing is not properly achieved, the electricity charge charged to equipment located on each customer premise become uneven. Accordingly, a load balancing technology is introduced and used, in which electricity is evenly distributed according to a load to evenly pay the electric charge as much as the electric charge is used.

However, since the load balancing technique in the related art described above is performed almost at the distribution point, it is necessary to perform line resistance measurement for performing the load balancing whenever a use environment is changed, determination of the amount of power at each customer premise through the line resistance measurement, providing the determined amount of the power to each customer premise, and the like, and as a result, thereby making it difficult to design the distribution point.

In addition, in a case where the reverse power feeding is not properly performed from the customer premise to the distribution point, it is difficult to check the case at the distribution point. Therefore, there is a problem that it is difficult to perform the load balancing itself.

Accordingly, the present invention has been made in an effort to present a reverse power feeding apparatus and a method thereof, which measure line resistance of a communication line directly connected to the distribution point at each customer premise and reflects the measured line resistance to perform power feeding to the distribution point, thereby feeding power having a capacity which is averagely almost similar to the distribution point from each customer premise.

Next, a brief description will be given of the prior art in the technical field of the present invention, and then, a technical matter which the present invention intends to differentiate from the prior art will be described.

First, U.S. Pat. No. 9,319,537 (registered on Apr. 19, 2016) is a technique for load balancing of reverse power feeding to estimate communication line power loss in a normal communication system.

A difficulty in the power feeding between the existing central office (CO) and the DP is that since a local power supply for the DP is either expensive to install or impossible to install, the power is fed not to be interrupted by data communication by configuring power source equipment (PSE) in the customer premise equipment (CPE). The CPE includes Power over Ethernet (POE) and the POE delivers power to the DP via a twisted pair. Theoretically, each CPE needs to deliver the same amount of power to the DP, but a power feeding amount of a power device (PD) is not the same due to a difference in the length of the twisted pair between the DP and the CPE. In particular, a CPE with a long twisted pair needs to provide more power than a short CPE. The prior art aims at balancing the power feeding of the CPE by configuring a power supply unit having a large number of interface ports in the DP.

However, since the present invention proposes a technical configuration for measuring the line resistance of the communication line connected to the distribution point at the customer premise and performing the reverse power feeding to the distribution point by reflecting the measured line resistance, there is a clear difference in the technical characteristics between the present invention and the prior art that proposes the technical configuration that just balances the power feeding of the CPE at the DP by configuring the power supply unit having a large number of interface ports.

Further, U.S. Pat. Registration No. 8,897,431 (registered on Nov. 25, 2014), which relates to a technique for feeding power to an outdoor broadband cabinet is a technique that receives power from the customer premise without using local power in order to increase efficiency of miniaturization and installation of the cabinet.

In the prior art, the power is converted into DC power and transmitted through a wire line in subscriber equipment and the transmitted power is regulated and fed to the broadband equipment of the cabinet again. In addition, when the power is transmitted in the subscriber equipment, the power may be transmitted while being adjusted to the type of power required by the broadband equipment. Therefore, the broadband equipment is supplied with the power adjusted by matching the power required by the broadband equipment of the cabinet with the DC power actually supplied.

However, since the present invention provides the technical configuration that measures the line resistance of a communication line connected to the distribution point at the customer premise and performing the reverse power feeding to the distribution point by reflecting the measured line resistance, the present invention has a clear difference in the technical characteristics from the prior art which proposes only the technical configuration that supplies the power to the cabinet in the subscriber equipment and does not describe the load balancing technique.

The U.S. Registered Pat. No. 7,672,448 (registered on Mar. 2, 2010) which discloses contents regarding a device for supplying power to a network device, a technique that supplies power to a residential gateway positioned outside a home in a remote power supply device positioned in the home by using the existing telephone line.

The prior art proposes a scheme in which since the residential gateway is located in a network interface device (NID) outside the home, there is a problem of power supply and there is an NID device which cannot supply AC power, and as a result, the power is supplied to the residential gateway by a method that sues the existing telephone line instead of installing a new telephone line which is high in cost.

However, since the present invention provides the technical configuration that measures the line resistance of the communication line connected to the distribution point at the customer premise and performing the reverse power feeding to the distribution point by reflecting the measured line resistance, the present invention has a clear technical difference in that the load balancing can be performed with respect to the power feeding to the distribution point at the customer premise from the prior art which describes only the configuration that supplies power to the gateway located outside the home from the remote power supply device located in the home.

That is, most of the prior arts including the above-mentioned prior arts have proposed the configuration in which the power supply unit having multiple interface ports is configured in the DP to balance the power supply of the CPE at the DP, but the load balancing technique of the related art performed at the distribution point is very complicated in execution process and the design of the distribution point is thus difficult, and performing the load balancing itself is difficult when the reverse power feeding to the distribution point at each customer premise is not properly performed, and as a result, has a clear technical difference from a configuration of the present invention in which in which power having a capacity which is averagely similar is supplied to the distribution point by reflecting the line resistance of the communication line at each customer premise, thereby stably supplying the power to the distribution point through the load balancing at each customer premise.

SUMMARY

The present invention is contrived to solve the problem and has been made in an effort to provide an apparatus for reverse power feeding in accordance with communication line environments and a method thereof, which measure line resistance of a communication line connected with a distribution point by each a reverse power feeding device at one or more customer premises and reflect the measured line resistance to perform power feeding to the distribution point when the reverse power feeding is performed in an access network system.

Further, the present invention has also been made in an effort to provide an apparatus for reverse power feeding in accordance with communication line environments and a method thereof, which power having a capacity which is almost similar is averagely supplied to the distribution point by reflecting the line resistance of the communication line at each customer premise to easily perform load balancing to the distribution point from each customer premise.

An exemplary embodiment of the present invention provides an apparatus for reverse power feeding in accordance with communication line environments, comprises: a load balancing processing unit measuring line resistance of a communication line connected with a distribution point and determining a power supply amount to be provided to the distribution point; and a power processing unit generating power required for reverse power supply according to the determined power supply amount and outputting the generated power to the distribution point, in which in the case of the reverse power supply, the power supply amount is controlled and output based on the line resistance of the communication line on a customer premise so as to supply predetermined specific power to the distribution point.

The apparatus for reverse power feeding may further comprise a storage unit constructing and storing, in advance, table information regarding the line resistance measured while adjusting the length of the communication line connecting the customer premise and the distribution point to a certain unit so that predetermined power is equally supplied from each customer premise on the distribution point and the power supply amount to be output to the distribution point from the customer premise according to the line resistance measured while adjusting the length of the communication line to a certain unit. For reference, in VoIP FXS, and FXO, there is line length measurement technology and resistance of a line may be measured by long-loop, short-loop, etc., and there is a technique of measuring the length even in VDSL, ADSL, and G.hn. In particular, in the case of G.hn, the length is measured by checking a return time of a reflected wave of a signal.

In the present invention, various methods of measuring the line resistance may be utilized, and includes a method of measuring and calculating a relative resistance value by measuring current flowing through current flowing in the line.

The load balancing processing unit may comprise a line resistance measuring unit measuring the line resistance of the communication line connecting the customer premise and the distribution point when the reverse power supply to the distribution point is required, and a power supply amount determining unit determining the power supply amount corresponding to the line resistance measured by the line resistance measuring unit by referring to the table information stored in the storage unit.

The power processing unit may comprise a power supply unit rectifying external AC power and converting the AC power to DC, and a power source equipment (PSE) powering up the DC voltage converted by the power supply unit and injecting the DC voltage onto the communication line in order to perform the reverse power supply to the distribution point according to the power supply amount determined by the load balancing processing unit.

In the apparatus for reverse power feeding, the distribution point may be driven by receiving power equally divided from each of one or more customer premises connected through the communication line via the reverse power supply.

Another exemplary embodiment of the present invention provides a method for reverse power feeding in accordance with communication line environments, comprises: a load balancing processing step of measuring, by a reverse power feeding apparatus, line resistance of a communication line connected with a distribution point and determining a power supply amount to be provided to the distribution point; and a power processing step of generating power required for reverse power supply according to the determined power supply amount and outputting the generated power to the distribution point, in which in the case of the reverse power supply, the power supply amount is controlled and output based on the line resistance of the communication line on a customer premise so as to supply predetermined specific power to the distribution point.

The method for reverse power feeding may further comprise a storage step of constructing and storing, by the reverse power feeding apparatus, in advance, table information regarding the line resistance measured while adjusting the length of the communication line connecting the customer premise and the distribution point to a certain unit so that predetermined power is equally supplied from each customer premise on the distribution point and the power supply amount to be output to the distribution point from the customer premise according to the line resistance measured while adjusting the length of the communication line to a certain unit.

The load balancing processing step may comprise a line resistance measuring step of measuring, by a line resistance measuring unit, the line resistance of the communication line connecting the customer premise and the distribution point when the reverse power supply to the distribution point is required, and a power supply amount determining step of determining, by a power supply amount determining unit, the power supply amount corresponding to the line resistance measured by the line resistance measuring unit by referring to the table information stored in the storage unit.

The power processing step may comprise an applied power converting step of rectifying external AC power and converting the AC power to DC, and a supply step of powering up the DC voltage converted by the applied power converting step through a power source equipment (PSE) and injecting the DC voltage onto the communication line in order to perform the reverse power supply to the distribution point according to the power supply amount determined by the reverse power feeding apparatus.

In the method for reverse power feeding, the distribution point may be driven by receiving power equally divided from each of one or more customer premises connected through the communication line via the reverse power supply.

As described above, according to an apparatus for reverse power feeding in accordance with communication line environments and a method thereof of the present invention, power feeding required at a distribution point is performed by reflecting line resistance of a communication line at each customer premise connected with the distribution point to easily perform a load balancing operation of averagely supplying power having a capacity which is almost similar to the distribution point by reflecting the line resistance of the communication line at each customer premise and perform stable power feeding to the distribution point at each customer premise and stabilize an operation of the distribution point based on the stable power feeding.

In addition, in the present invention, since the load balancing performed at the distribution point is performed by reflecting the line resistance of the communication line with the distribution point at multiple customer premises as described in the prior art, a design of the distribution point can be simply performed, and as a result, it is possible to simplify a management and an operation of the distribution point.

In addition, it is possible to remotely control the reverse power feeding to be provided at the customer premise and the provided reverse power feeding to be received and processed to efficiently operate a communication facility of an access network.

Further, by using electricity as much as a communication service is used depending on a distance of the communication line connected to the distribution point on each customer premise, there is an effect that a problem that may occur when applying a meter-rate system can be solved.

BRIEF DESCRIPTION OF THE DRAWINGS

For more complete understanding of this disclosure, reference is now made to the following brief description, taken in connection with the accompanying drawings and detailed description.

DETAILED DESCRIPTION

Figure 1:
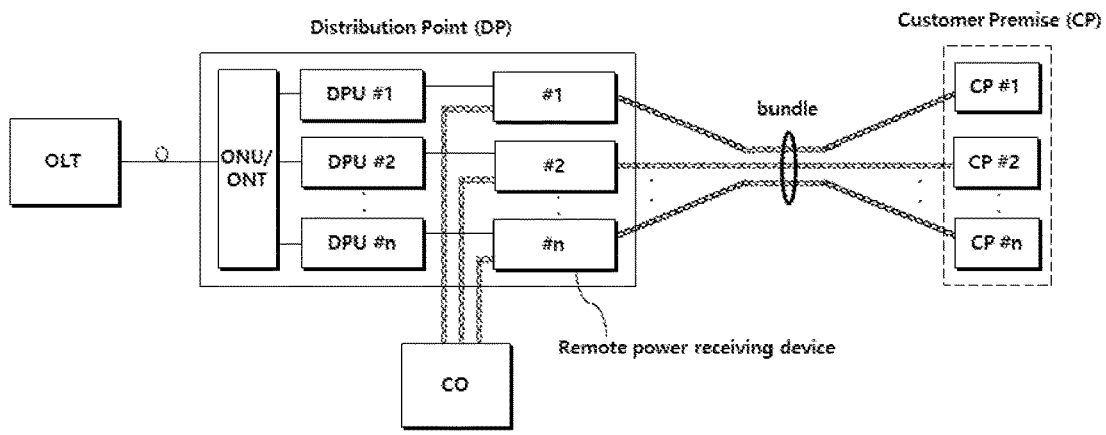
FIGS. 1 and 2 are conceptual views for describing a process of reverse power feeding in accordance with communication line environments according to an exemplary embodiment of the present invention.

Hereinafter, an apparatus for reverse power feeding in accordance with communication line environments and a method thereof according to the present invention will be described in detail with reference to the accompanying drawings. The present invention may be implemented in various different forms and is not limited to exemplary embodiments described herein. Throughout the specification, like reference numerals refer to like elements.

Figure 2:
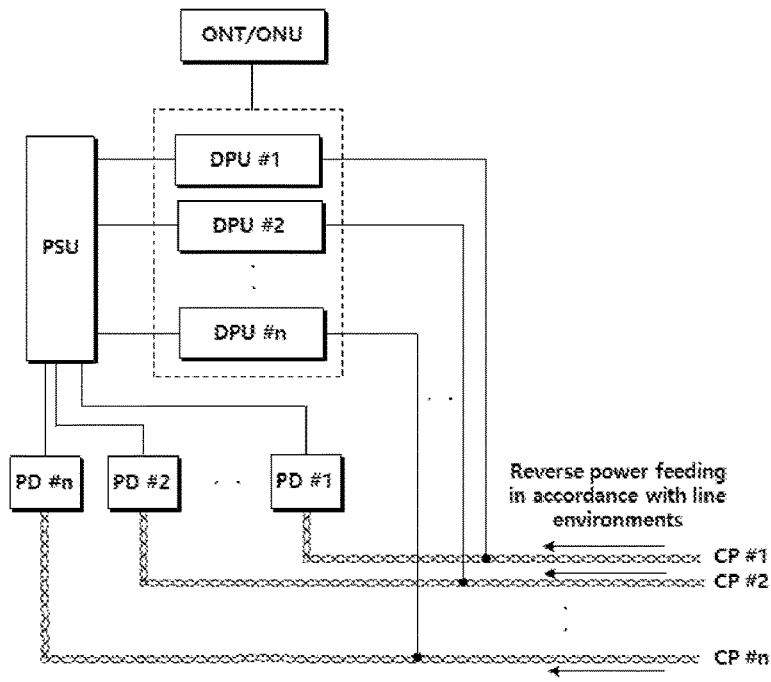

FIGS. 1 and 2 are conceptual views for describing a process of reverse power feeding in accordance with communication line environments according to an exemplary embodiment of the present invention.

As illustrated in FIGS. 1 and 2, in a customer network system of the present invention, an optical line terminal (OLT) is connected to an upper terminal of a distribution point (DP) including an optical network unit (ONU)/optical network terminal (ONT) and a distribution point unit (DPU) through an optical cable and customer premise (CP)-side equipment including a remote power receiving device is connected with a lower terminal of the DP. In addition, multiple devices including a PC, a TV, a telephone, and the like are connected to a CP-side modem via a LAN cable.

The remote power receiving device is connected between the DPU and the CP-side modem. The remote power receiving device is connected to the DPU or a CO to selectively connect the DPU with the OLT or to the CO through the ONU/ONT according to remote control of an inverse power feeding device provided at the CP.

The remote power receiving device as a component driven by power and signals supplied from the reverse power feeding device (or apparatus) at the CP may include a powered device (PD) receiving power by reverse power feeding at the CP when the CP and the DPU are connected with each other and a power supply unit (PSU) adjusting power input from the PD and outputting the adjusted power to the DPU. In this case, one PD may be provided for each DPU channel The remote power receiving device supplies the power provided from the reverse power feeding device on the CP through the communication line to the PSU via the PD and operates the DPU with the power collected by the PSU.

The reverse power feeding device provided on the CP and a component for remotely controlling the remote power receiving device on the DP serves to supply reverse power and a control signal for connection of a communication service to the remote power receiving device on the DP.

In this case, the reverse power feeding device on the CP measures the line resistance on the communication line connecting the CP and the DP and determines a power supply amount to be supplied to the DP based on the measured line resistance and processes the reverse power supply to stably operate through the power received from each CP on the DP.

That is, the present invention as a component that includes the reverse power feeding device on the CP and the remote power receiving device and the DPU on the DP to control power transmission to the remote power receiving device on the DP measures the line resistance of the communication line directly connected with the DP on each CP and thereafter, reflects the measured line resistance to perform power supply to the DP, thereby averagely supplying power having almost similar capacity to the DP from each DP.

For example, assuming that four CPs are connected to the DP and the distances of the communication lines of the DP and the four CPs are different from each other, the line resistance is measured according to the distance of the communication line and then the reverse power is supplied by adjusting the power supply amount so that the reverse power supply is performed at higher power as the distance of the communication line increases. That is, considering the power lost by the line resistance in the reverse power supply process at each CP, the reverse power supply is performed to the DP by differently adjusting the initially output power supply amount.

As a result, the DP is averagely supplied with power having the almost similar capacity from each CP to perform a stable operation. In addition, since the load balancing performed on the DP in the related art is directly performed by reflecting the line resistance according to the length of the communication line on multiple CPs, it is possible to simplify the design of the DP and simplify the management and operation. Further, by using electricity as much as a communication service is used depending on the distance of the communication line connected to the distribution point on each customer premise, a problem that may occur when applying a meter-rate system may be solved.

The reverse power supply process from the reverse power feeding device provided on the CP to the DP will be described in more detail as follows.

First, the CP side reverse power feeding device is connected to the CP so that predetermined power is supplied from the at least one CP connected through the communication line at the DP, the line resistance is measured while adjusting the length of the communication line connecting the DP to a certain unit. By measuring the line resistance on the communication line, information on the length of the communication line may be confirmed and based on the information, it is possible to confirm how much power is supplied from the CP to receive desired power to the DP.

Next, the reverse power feeding device on the CP sets the power supply amount to be outputted from the CP to the DP based on the line resistance measured while adjusting the length of the communication line to a certain unit.

After measuring the line resistance of each length and setting the power supply amount for each line resistance, the reverse power feeding device of the CP is connected to the line resistance of each communication line connecting the CP and the DP. Then, table information about the power supply amount to be output to the DP is constructed and stored in the storage unit.

Thereafter, the reverse power feeding device provided on each CP confirms whether reverse power supply is required to the DP for using the communication service.

If it is necessary to supply the reverse power to the DP, the reverse power feeding device confirms whether the DP is electrically connected through the communication line.

Thereafter, the reverse power supply of the CP measures the line resistance on the communication line connected to the DP. That is, the length of the communication line connecting the CP and the DP is measured.

After the measurement of the line resistance, the CP-side reverse power feeding device refers to the table information stored in the storage unit to determine the amount of power to be output to the DP according to the current line resistance. That is, the power supply amount for performing the reverse power supply to the DP is determined based on the table information on the line resistance according to the length of the communication line and the power supply amount according to each line resistance.

After the power supply amount to be provided to the DP is determined, the CP side reverse power feeding device performs power-up of the PSE according to the determined power supply amount to generate power required for the reverse power supply and supply the generated power to the PD of the DP through the communication line.

That is, the power supply amount is regulated and output on the basis of the line resistance of the communication line on each CP so that predetermined power determined in advance for driving the DP on each CP is supplied to the DP.

On the other hand, the remote power receiving device on the DP performs the operation based on the power transmitted from the CP side reverse power feeding device. That is, the remote power receiving device supplies the power provided from the reverse power feeding device on the CP through the communication line to the PSU via the PD and operates the DPU with the power collected by the PSU to allow each CP to use the communication service.

At this time, the DP is driven by receiving power equally divided from each of one or more CPs connected through the communication line via the reverse power supply.

Figure 3:
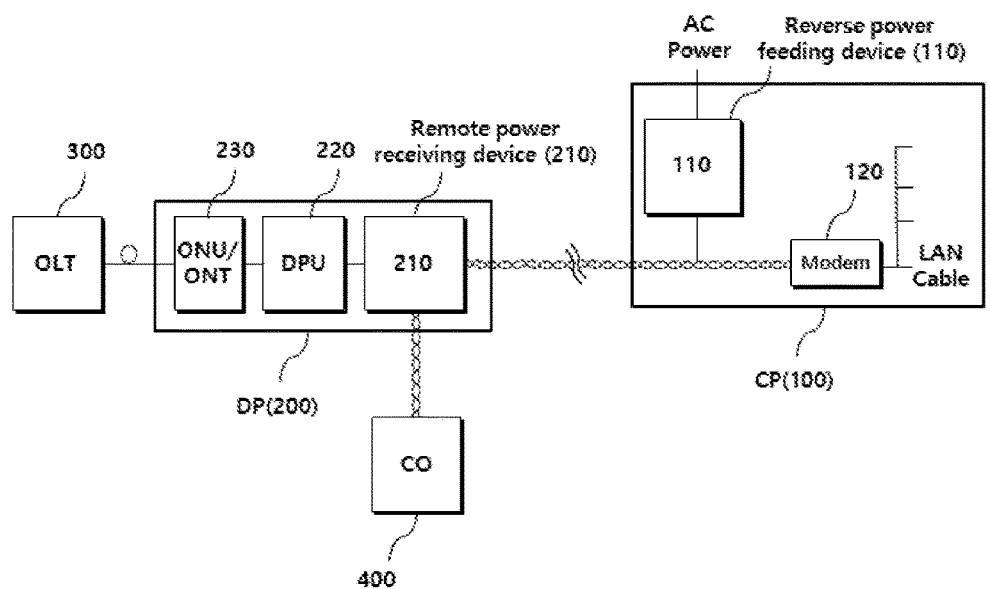
FIG. 3 is a diagram schematically illustrating a configuration of an apparatus for reverse power feeding in accordance with communication line environments according to an exemplary embodiment of the present invention.
Figure 4:
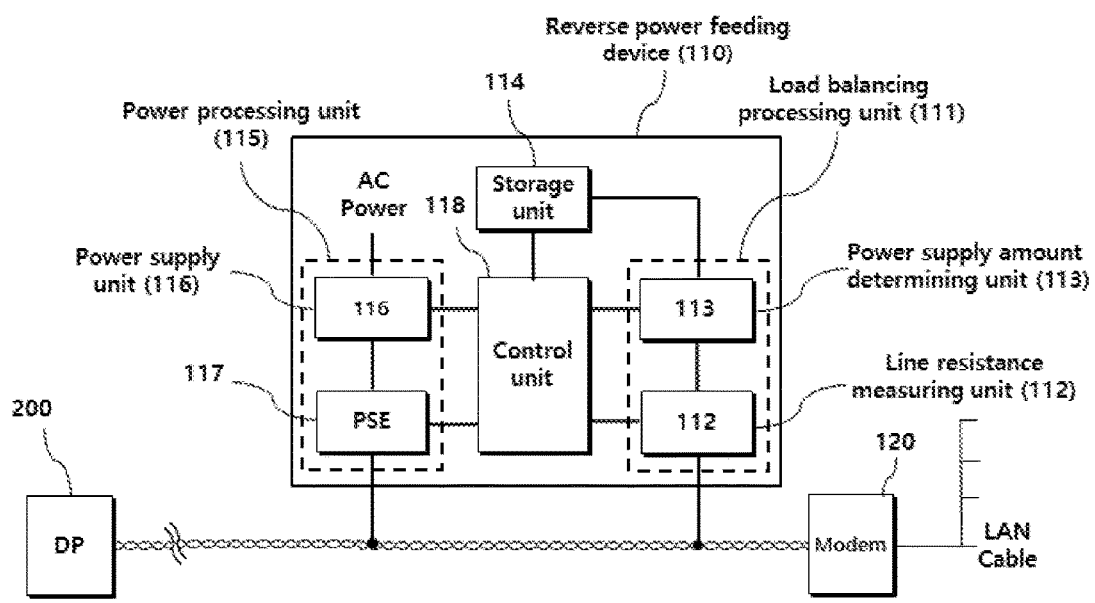
FIG. 4 is a diagram specifically illustrating the configuration of the apparatus for reverse power feeding provided at a customer premise of FIG. 3.

FIG. 3 is a diagram schematically illustrating a configuration of an apparatus for reverse power feeding in accordance with communication line environments according to an exemplary embodiment of the present invention and FIG. 4 is a diagram specifically illustrating the configuration of the apparatus for reverse power feeding provided at a customer premise of FIG. 3.

As illustrated in FIG. 3, the customer network system to which the present invention is applied includes a customer premise (CP) 100, a distribution point (DP) 200, an OLT 300, a CO 400, and the like. The OLT 300 connected to the DP 200 through the DPU 220 and the CO 400 connected to the remote power receiving device 210 are located at the upper terminal of the DP 200 and the CP 100 connected through the remote power receiving device 210 is located at the lower terminal. The remote power receiving device 210 may be selectively connected with the OLT 300 or the CO 400 via the ONU/ONT 230 through the DPU 220 according to the remote control of the reverse power feeding device 110 provided in the CP 100 in connection with the DPU 220 or the CO 400.

The CP 100 includes the reverse power supply unit 110 supplying reverse power to the remote power receiving device 210 on the DP 200 and transmitting a control signal for connection of the communication service and a modem 120 that includes a PC, a TV, a telephone, and the like and is connected to the PC, the TV, the telephone, and the like to provide voice and data.

The reverse power feeding device 110 as a component which performs a function of regulating the power supply amount based on the line resistance of the communication line at the CP 100 and outputting the power supply amount so that predetermined specific power is supplied to the DP 200 includes a load balancing processing unit 111 including a line resistance measuring unit 112 and a power supply amount determining unit 113, a storage unit 114, a power processing unit 115 including a power supply unit 116 and a PSE 117, a control unit 118, and the like as illustrated in FIG. 4.

The load balancing processing unit 111 serves to measure the line resistance of the communication line connecting the CP 100 and the DP 200 and determine the power supply amount to be supplied to the DP 200 based on the measured line resistance.

The load balancing processing unit 111 is constituted by the line resistance measuring unit 112 checking the length of the communication line through the line resistance measurement of the communication line connecting the CP 100 and the DP 200 when the reverse power supply to the DP 200 is required and the power supply amount determining unit 113 determining the power supply amount corresponding to the line resistance measured by the line resistance measuring unit 112 by referring to the table information stored in the storage unit 114.

The storage unit 114 constructs and stores, in advance, table information regarding the line resistance measured while adjusting the length of the communication line connecting the CP 100 and the DP 200 to a certain unit so that predetermined power is equally supplied from each CP 100 on the DP 200 and the power supply amount to be output to the DP 200 from the CP 100 according to the line resistance measured while adjusting the length of the communication line to a certain unit.

In addition, the storage unit 114 stores various control programs used in the reverse power feeding device 110.

The power processing unit 115 serves to generate a power required to supply the reverse power according to the power supply amount determined by the power supply amount determining unit 113 of the load balancing processing unit 111 and output the generated power to the DP 200.

The power processing unit 115 includes the power supply unit 116 that rectifies external AC power and converts the AC power to DC and the PSE 117 that powers up the DC voltage converted by the power supply unit 116 and injects the DC voltage onto the communication line in order to perform the reverse power supply to the DP 200 according to the power supply amount determined by the power supply amount determining unit 113 of the load balancing processing unit 111.

The control unit 118 serves to integrally control storing of the table information related to the line resistance according to the length of the communication line of the storage unit 114 and the power supply amount according to the line resistance, the line resistance measurement and power supply amount determination in the load balancing processing unit 111, and generation of the power to be supplied to the DP 200 in the power processing unit 115.

The DP 200 is embedded in a basement or under the ground outside the house or in a manhole and includes the remote power receiving device 210, the DPU 220, the ONU/ONT 230, and the like. At this time, the DP is driven by receiving the power equally divided from each of one or more CPs connected through the communication line via the reverse power supply.

The remote power receiving device 210 includes one or more PDs receiving the power by the inverse power supply of the CP 100, the PSU adjusting the power input from the PD and outputting the adjusted power to the DPU 220, and the like.

The remote power receiving device 210 provides the power provided from the reverse power feeding device 110 on the CP through the communication line to the PSU via the PD and operates the DPU 220 with the power collected by the PSU.

The DPU 220 is operated by the power received from the CP 100 through the remote power receiving device 210 in a reverse direction to serve to connect the CP 100 to the network.

Next, an exemplary embodiment of a method for reverse power feeding in accordance with communication line environments according to the present invention configured as above will be described in detail with reference to FIG. 5. At this time, the order of each step according to the method of the present invention may be changed in the use environment or by those skilled in the art.

Figure 5:
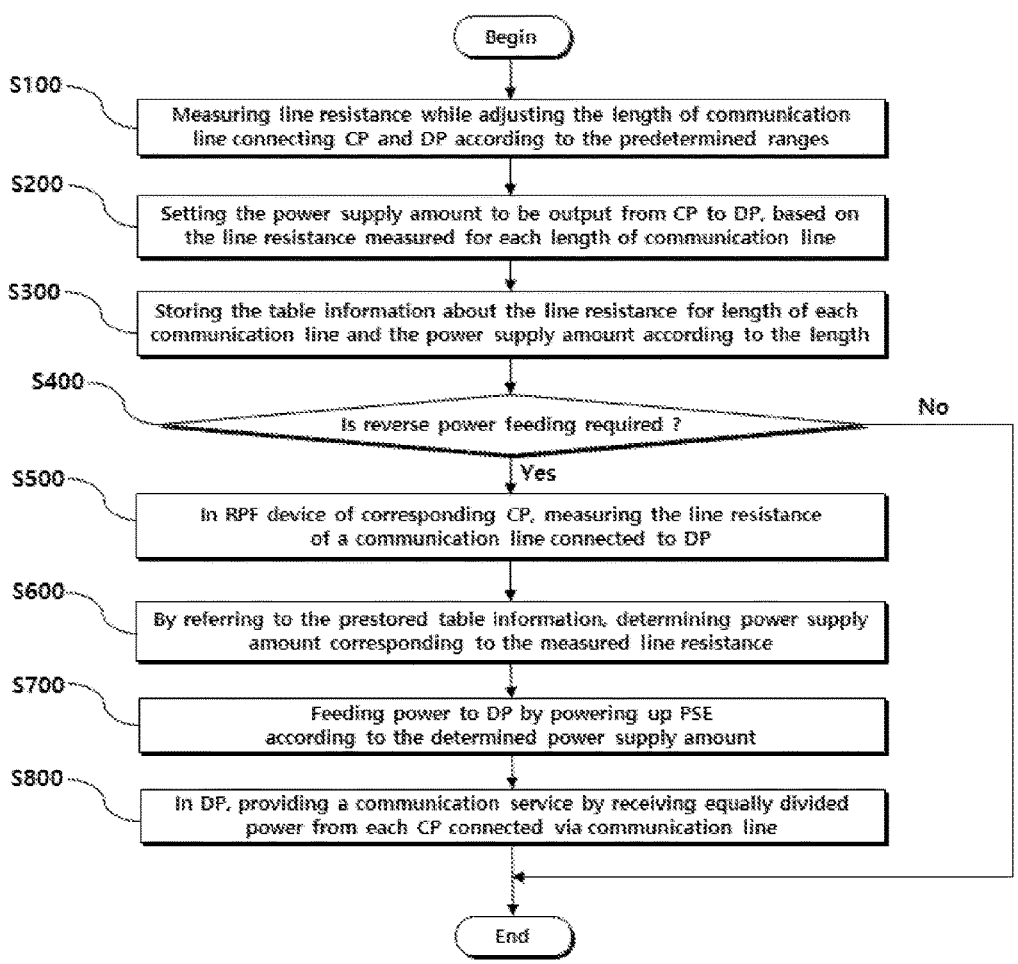
FIG. 5 is a flowchart specifically illustrating an operation process of a method for reverse power feeding in accordance with communication line environments according to an exemplary embodiment of the present invention.

FIG. 5 is a flowchart specifically illustrating an operation process of a method for reverse power feeding in accordance with communication line environments according to an exemplary embodiment of the present invention.

First, the reverse power feeding device 110 on the CP 100 measures the line resistance while adjusting the length of the communication line connecting the CP 100 and the DP 200 (here, it is exemplified that the length is adjusted to a certain unit of 1 m or 5 m, but the length may be dividedly adjusted to a predetermined range of 5 to 10 m) so as to operate by receiving predetermined specific power from one or more CPs 100 on the DP 200 before performing the communication service (S100).

That is, information on the length of the communication line is checked through line resistance measurement on the communication line connecting the CP 100 and the DP 200. Then, it is possible to confirm how much power is supplied from the CP 100 to receive the desired power to the DP 200 based on the line resistance.

After measuring the line resistance of each length of the communication line through step S100, the reverse power feeding device 110 of the CP 100 adjusts the length of the communication line based on the line resistance of each length measured while adjusting the length of the communication line and sets the power supply amount to be output from the CP 100 to the DP 200 (S200).

After setting the power supply amount to be output from the CP 100 to the DP 200 in accordance with the line resistance for each length through step S200, the reverse power feeding device 110 on the CP 100 constructs the table information on the power supply amount to be output to the DP according to the line resistance of each communication line length and the line resistance of each length and stores the table information in the storage unit 114 (S300).

After constructing the table information on the power supply amount according to the line resistance of each length of the communication line through the step S300, the reverse power feeding device 100 provided on each CP 100 determines whether the reverse power supply to the DP 200 is required (S400). That is, it is checked whether there is a request for the communication service from the device such as a computer or the TV provided in the home of the CP 100.

As a result of the determination in step S400, if it is determined that the reverse power supply is required to the DP 200, the reverse power feeding device 100 on the CP 100 is in a state of being electrically connected to the DP 200 through the communication line. For example, after a pulse signal of a predetermined voltage (for example, 8 V) is transmitted from the PSE provided in the reverse power feeding device 110 on the CP 100 to the PD provided on the DP 200 for several ms, it is checked whether the communication lines of the CP 100 and the DP 200 are connected based on whether a response to the pulse signal is performed in the PD 200.

Thereafter, the reverse power feeding device 110 of the CP 100 measures the line resistance on the communication line connected to the DP 200 (S500). More specifically, the length of the communication line connecting the CP 100 and the DP 200 is checked through the line resistance measurement on the communication line.

After the measurement of the line resistance through step S500, the CP-side reverse power feeding device 110 on the CP 100 refers to the table information stored in the storage unit 114 to determine the power supply amount to be output to the DP 200 according to the current line resistance (S600). That is, a load balancing step is performed, in which the power supply amount for performing the reverse power supply to the DP 200 is determined based on the table information on the line resistance according to the length of the communication line and the power supply amount according to each line resistance.

When the power supply amount to be provided to the DP 200 is determined through step S600, the reverse power feeding device 110 on the CP 100 performs power-up of the PSE 117 according to the determined power supply amount to generate power required for the reverse power supply and supply the generated power to the PD of the DP 200 through the communication line (S700).

That is, a power processing step is performed, in which the AC power supplied from the outside through the power supply unit 116 is rectified and converted into DC so that predetermined power determined in advance for driving the DP 200 on each CP 100 is supplied to the DP 200 and the DC voltage converted through the power supply unit 116 is powered up through the PSE 117 and injected onto the communication line in order to perform the reverse power supply to the DP 200 according to the power supply amount determined by the reverse power supply unit 110.

Then, the remote power receiving device 210 on the DP 200 operates based on the power transmitted from the reverse power feeding device 100 on the CP 100 to perform the communication service (S800).

That is, the remote power receiving device 210 of the DP 200 provides the power provided from the reverse power feeding device 110 on the CP 100 through the communication line to the PSU via the PD and operates the DPU 220 with the power collected by the PSU to allow each CP 100 to use the communication service.

At this time, the DP 200 is driven by receiving the power equally divided from each of one or more CPs 100 connected through the communication line via the reverse power supply.

As described above, according to the present invention, power feeding required at a distribution point is performed by reflecting line resistance of a communication line at each customer premise connected with the distribution point to easily perform a load balancing operation of averagely supplying power having a capacity which is almost similar to the distribution point by reflecting the line resistance of the communication line at each customer premise and perform stable power feeding to the distribution point at each customer premise and stabilize an operation of the distribution point based on the stable power feeding.

Further, since the load balancing performed at the distribution point is performed by reflecting the line resistance of the communication line with the distribution point at multiple customer premises as described in the prior art, it is possible to simplify a design, a management, and an operation of the distribution point.

Further, by using electricity as much as a communication service is used depending on a distance of the communication line connected to the distribution point on each customer premise, there is an effect that a problem that may occur when applying a meter-rate system can be solved.

Here, as described above, the present invention has been described with reference to the exemplary embodiments of the present invention. However, it will be appreciated by those skilled in the art that various modifications and changes of the present invention can be made without departing from the spirit and the scope of the present invention which are defined in the appended patent claims.

What is claimed is:

1. An apparatus for reverse power feeding in accordance with communication line environments comprises:
   a load balancing processing unit measuring a line resistance of a communication line connected with a distribution point and determining power supply amount to be provided to the distribution point based on the measured line resistance; and
   a power processing unit generating power required for reverse power feeding according to the determined power supply amount and outputting the generated power to the distribution point;
   wherein the power supply amount is controlled and outputted based on the line resistance of the communication line at a customer premise so as to feed predetermined power to the distribution point.

2. The apparatus of claim 1, the apparatus further comprises:
   a storage unit storing in advance, table information regarding the measured line resistance and the power supply amount.

3. The apparatus of claim 2, wherein the load balancing processing unit comprises:
   a line resistance measuring unit measuring the line resistance of the communication line connecting between the customer premise and the distribution point when the reverse power feeding to the distribution point is required; and
   a power supply amount determining unit determining the power supply amount corresponding to the measured line resistance by referring to the table information.

4. The apparatus of claim 1, wherein the power processing unit comprises:
   a power supply unit rectifying external AC power and converting the AC power to DC; and
   a power source equipment (PSE) powering up the DC voltage and injecting the DC voltage onto the communication line in order to perform the reverse power feeding according to the power supply amount.

5. The apparatus of claim 1, wherein the apparatus makes the distribution point driven by receiving power equally divided from each of one or more customer premises connected through the communication line via the reverse power feeding.

6. A method for reverse power feeding in accordance with communication line environments, the method comprises:
   measuring a line resistance of a communication line connected with a distribution point and determining power supply amount to be provided to the distribution point based on the measured line resistance; and
   generating power required for reverse power feeding according to the determined power supply amount and outputting the generated power to the distribution point;
   wherein the power supply amount is controlled and outputted based on the line resistance of the communication line at a customer premise so as to feed predetermined power to the distribution point.

7. The method of claim 6, wherein the method further comprises:
   storing in advance, table information regarding the measured line resistance and the power supply amount.

8. The method of claim 7, wherein the apparatus further comprises:
   measuring the line resistance of the communication line connecting between the customer premise and the distribution point when the reverse power feeding to the distribution point is required; and
   determining the power supply amount corresponding to the measured line resistance by referring to the table information.

9. The method of claim 6, wherein the method further comprises:
   rectifying external AC power and converting the AC power to DC; and
   powering up the DC voltage and injecting the DC voltage onto the communication line in order to perform the reverse power feeding according to the power supply amount.

10. The method of claim 6, wherein the method makes the distribution point driven by receiving power equally divided from each of one or more customer premises connected through the communication line via the reverse power feeding.

* * * * *